(12) United States Patent
Wyer

(10) Patent No.: US 6,481,915 B1
(45) Date of Patent: Nov. 19, 2002

(54) SNAP FIT STUD

(75) Inventor: Andrew F. Wyer, Comberton (GB)

(73) Assignee: Xerox Corporation, Stamford, CT (US)

( * ) Notice: Subject to any disclaimer, the term of this patent is extended or adjusted under 35 U.S.C. 154(b) by 144 days.

(21) Appl. No.: 09/717,846

(22) Filed: Nov. 20, 2000

(51) Int. Cl.⁷ ............................................... F16B 13/00
(52) U.S. Cl. .................................. 403/329; 403/406.1
(58) Field of Search ........................... 403/405.1–408.1, 403/315, 316, 397, 321, 325–327, 329, 319, 320, 373, 374, 192, 193, 252–253, 287

(56) References Cited

U.S. PATENT DOCUMENTS

| | | | |
|---|---|---|---|
| 2,339,161 A | 1/1944 | Fermier | 308/9 |
| 4,134,175 A | 1/1979 | Contoyanis | 16/2.1 |
| 4,154,527 A | 5/1979 | Schnall et al. | 355/75 |
| 4,344,658 A | 8/1982 | Ledgerwood, III | 308/8.2 |
| 4,804,277 A | 2/1989 | Counoupas | 384/537 |
| 5,131,733 A | 7/1992 | Lautenschlager et al. | 312/334.38 |
| 5,457,520 A | 10/1995 | Schell et al. | 355/213 |
| 5,511,885 A | 4/1996 | Coleman | 384/439 |
| 5,538,475 A | 7/1996 | Jaskowiak | 464/181 |
| 5,632,684 A | 5/1997 | Kumar et al. | 464/179 |
| 5,636,820 A | 6/1997 | Domenig | 248/220.21 |
| 5,651,632 A * | 7/1997 | Gordon | 24/662 |
| 5,716,161 A * | 2/1998 | Moore et al. | 24/453 |
| 5,810,272 A * | 9/1998 | Wallace et al. | 242/137.1 |
| 5,852,760 A | 12/1998 | Harris et al. | 399/262 |
| 5,857,129 A | 1/1999 | Harris | 399/12 |
| 6,024,497 A | 2/2000 | Leibman | 384/428 |
| 6,058,280 A | 5/2000 | Kumar et al. | 399/117 |

\* cited by examiner

*Primary Examiner*—Robert E. Pezzuto
(74) *Attorney, Agent, or Firm*—Andrew D. Ryan

(57) ABSTRACT

A mounting stud for supporting a component such as a gear in an imaging machine. The mounting stud is removably securable to a wall.

19 Claims, 7 Drawing Sheets

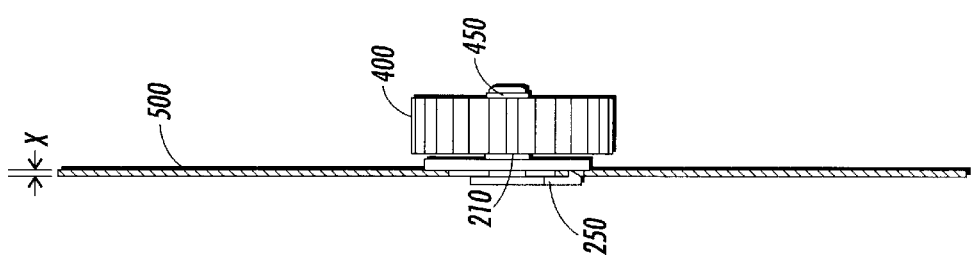
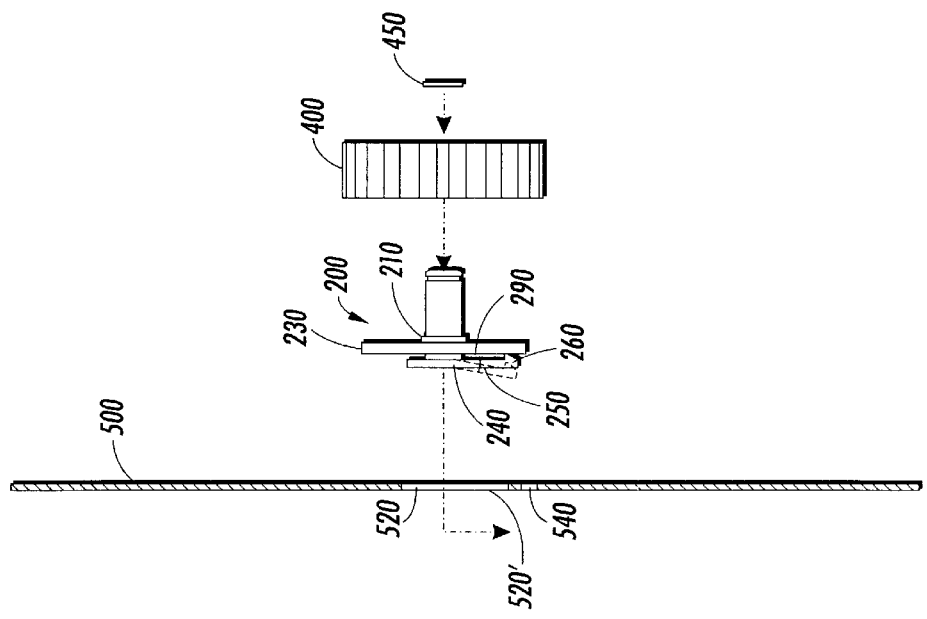

FIG. 7
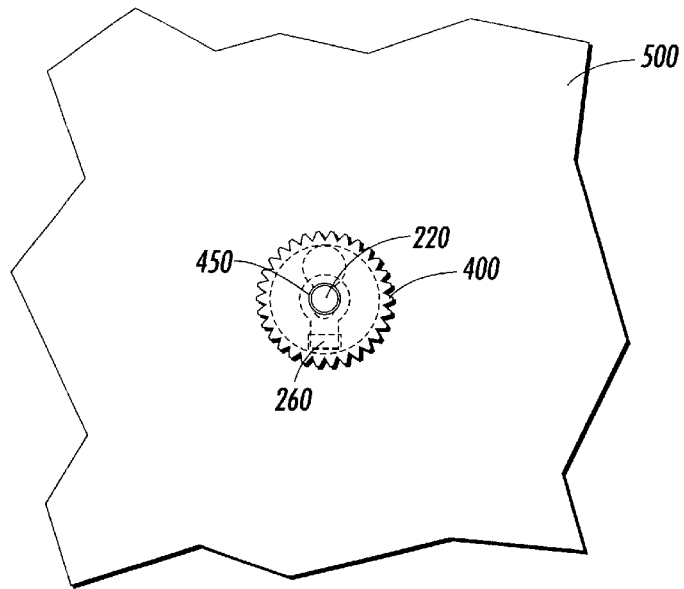
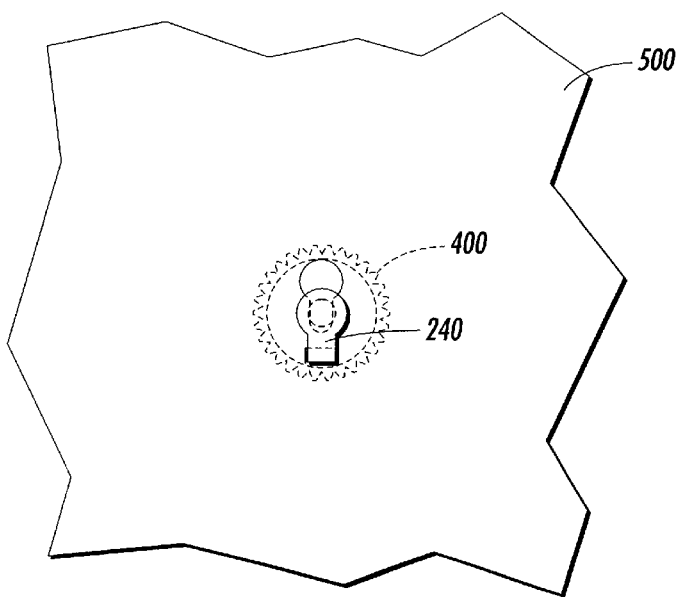
FIG. 8

SNAP FIT STUD

FIELD OF THE INVENTION

The present invention relates to a fastening system and more particularly to a mounting stud that is removable and/or securable to a wall of an imaging apparatus. The features of the present invention provide in embodiments a mounting system advantageously for use in most any apparatus which requires mounting studs.

BACKGROUND OF THE INVENTION

Electrophotographic marking is a well-known, commonly used method of copying or printing documents. Electrophotographic marking is performed by exposing a charged photoreceptor with a light image representation of a desired document. The photoreceptor is discharged in response to that light image, creating an electrostatic latent image of the desired document on the photoreceptor's surface. Toner particles are then deposited onto that latent image, forming a toner image, which is then transferred onto a substrate, such as a sheet of paper. The transferred toner image is then fused to the substrate, usually using heat and/or pressure, thereby creating a permanent record of the original representation. The surface of the photoreceptor is then cleaned of residual developing material and recharged in preparation for the production of other images. Other marking technologies, for example, electrostatographic marking and ionography are also well-known.

An electrophotographic marking machine generally may include studs for supporting and connecting parts such as a gear. Studs have typically been joined by welding, rivets, threads, or screws. Rivets may require the use of special machinery to assemble; rivets may become loose; rivets may rattle during use; and rivets may be generally difficult and expensive to remove for remanufacturing purposes. Screws have disadvantages in that they may require a substantial amount of assembly time, may become loose during use, and may become very time consuming to remove. Therefore, a stud that may be easily manufactured and that is removably securable to a surface for use with other components would be beneficial.

To conserve natural resources and provide for a machine with improved features and more new technology, machinery is often remanufactured and disassembled. The removal of a stud represents a cost associated with remanufacturing of the machines. The time required to remove a stud may be a significant remanufacturing cost factor. Moreover, it has been increasingly important to develop lighter materials for the framework of the machines. Accordingly, many modern machines utilize a fabricated sheet metal or plastic frame comprised of relatively thin walled support structures. It is therefore desirable to provide a stud which may be removably-securable to a wall and which provides generally high durability.

Reference is made to the following United States patents relating to reproduction machines and components including U.S. Pat. Nos. 6,024,497; 5,632,684; 5,511,885; 5,457,520; 4,804,277; and 4,134,175, the disclosures of which are incorporated by reference in their entireties.

All documents cited herein, including the foregoing, are incorporated herein by reference in their entireties.

SUMMARY OF THE INVENTION

The present invention relates to embodiments of a stud with snap-fit mounting features for use in walls of an imaging machine.

In accordance with one aspect of the invention, there is provided, a stud apparatus including a first member, a second member, and a third member. The first member extends along an imaginary axis between a proximal end and a distal end. The first member includes an outside periphery. A second member extends from the distal end of the first member axially along the imaginary axis and extends radially outward from the imaginary axis past the outside periphery of the first member. A third member extends from the second member axially along the imaginary axis and extends radially outward from the imaginary axis. The third member includes a leg extending outward from the imaginary axis spaced from the second member. The leg includes an end extending in a direction toward the second member.

In accordance with another aspect of the invention, there is provided, a mounting system for a xerographic imaging apparatus including a wall, a first member, a second member, and a third member. The wall includes a plurality of openings. The first member extends a length along an imaginary axis and includes an outside periphery. The second member extends along the imaginary axis and radially extends from an end of the first member. The third member extends along the imaginary axis from the second member and then radially outward from the imaginary axis forming a leg extending at least partially spaced from the second member. The leg includes a protrusion extending toward the second member. The protrusion removably secures to the wall. The wall is positioned between the second member and the leg in the xerographic imaging apparatus.

In accordance with a further aspect of the invention, there is provided, a stud apparatus including a member having a first portion and a second portion. The first portion extends a distance and includes a flange, a post, and a proximal end. The post is for receiving a component thereon. The second portion extends from the first portion for a distance to a distal end. The distal end includes a protrusion. The distal end moves between a first position and a second position for forming an opening between the protrusion and the flange and for receiving a wall functionally adjacent the proximal end. The protrusion is for fitting in an opening in the wall when the distal end is in the first position.

In accordance with another aspect of the invention, there is provided, a process of mounting a removably securable stud in a wall of an imaging apparatus including: orienting a stud with respect to a first hole in a wall of an imaging apparatus, the stud including a first member extending to a first end, a flange, and a second member including a leg extending to a second end, the leg adapted to be movable; placing the leg through the first hole in the wall such that the first member is on a first side of the wall and the leg is on a second side of the wall; and moving the stud with respect to the wall such that the second end of the leg becomes removably securable in a second hole in the wall. The process of mounting the removably securable stud may further include: inserting an opening of a component over the first member of the stud; and removably securing the component to the first member of the stud.

In accordance with a further aspect of the invention, there is provided, a mounting apparatus including a post member and a clip member. The post member extends along an imaginary axis between ends. The clip member extends from the post member and is for removable securement to a wall using two sides of the wall. The clip member has a protrusion for removable securement to an opening in the wall.

Still other features, aspects and advantages of the present invention and methods of construction of the same will become readily apparent to those skilled in the art from the following detailed description. As will be realized, the invention is capable of other and different embodiments and methods of construction, and its several details are capable of modification in various obvious respects, all without departing from the invention. Accordingly, the drawing and description are to be regarded as illustrative in nature, and not as restrictive.

BRIEF DESCRIPTION OF THE DRAWINGS

FIG. 3 illustrates a side elevational view of the stud mounting system;

FIG. 4 illustrates a side elevational view of the stud mounting system;

FIG. 7 illustrates a front elevational view of the stud mounting system of FIG. 1;

FIG. 8 illustrates a back elevational view of the stud mounting system of FIG. 1;

DETAILED DESCRIPTION OF THE INVENTION

The present invention relates to embodiments of a stud for mounting in walls of an imaging machine. While the principles of the present invention will be described in connection with an imaging machine, such as an electrostatographic reproduction machine, it should be understood that the present invention is not limited to that embodiment or to that application. Therefore, it is should be understood that the principles of the present invention extend to all alternatives, modifications, and equivalents as may be included within the spirit and scope of the appended claims.

Figure 10:
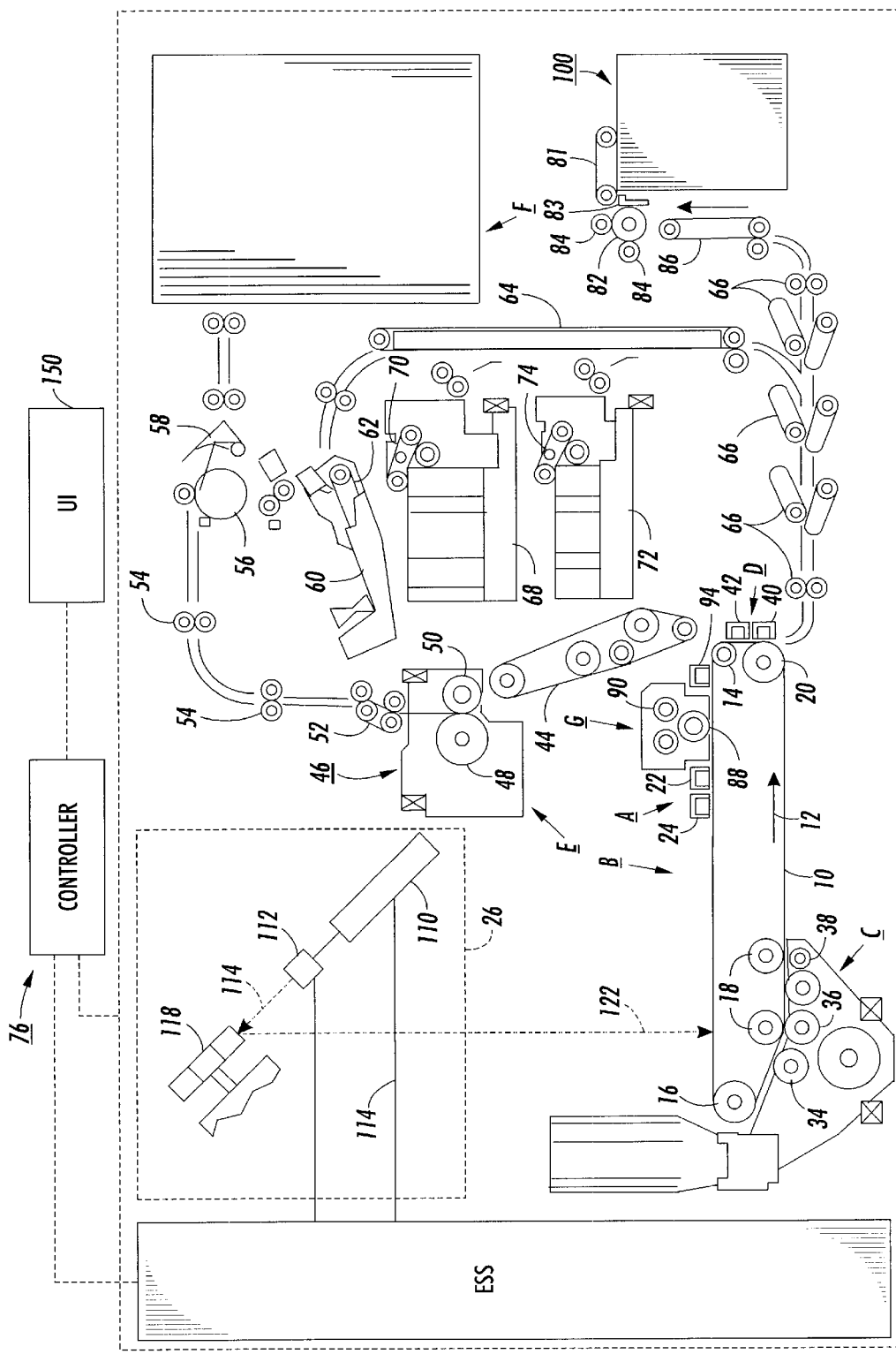
FIG. 10 is a schematic elevational view of an imaging machine utilizing the present invention.

Referring to FIG. 10 of the drawings, an illustrative imaging machine incorporating the stud of the present invention is shown. The imaging machine employs a photoconductive belt 10. Belt 10 moves in the direction of arrow 12 to advance successive portions sequentially through the various processing stations disposed about the path of movement thereof. Belt 10 is entrained about stripping roller 14, tensioning roller 16, idler roll 18 and drive s roller 20. As roller 20 rotates, it advances belt 10 in the direction of arrow 12.

Initially, a portion of the photoconductive surface passes through charging station A. At charging station A, two corona generating devices indicated generally by the reference numerals 22 and 24 charge the photoconductive belt 10 to a relatively high, substantially uniform potential.

Next, the charged portion of the photoconductive surface is advanced through imaging station B. At the imaging station, an imaging module indicated generally by the reference numeral 26, records an electrostatic latent image on the photoconductive surface of the belt 10. Imaging module 26 includes a raster output scanner (ROS). The ROS lays out the electrostatic latent image in a series of horizontal scan lines with each line having a specified number of pixels per inch. Other types of imaging systems may also be used employing, for example, a pivoting or shiftable LED write bar or projection LCD (liquid crystal display) or other electro-optic display as the "write" source.

The imaging module 26 (ROS) includes a laser 110 for generating a collimated beam of monochromatic radiation 122, an electronic subsystem (ESS), located in the machine electronic printing controller 100 that transmits a set of signals via 114 corresponding to a series of pixels to the laser 110 and/or modulator 112, a modulator and beam shaping optics unit 112, which modulates the beam 122 in accordance with the image information received from the ESS, and a rotatable polygon 118 having mirror facets for sweep deflecting the beam 122 into raster scan lines which sequentially expose the surface of the belt 10 at imaging station B. A user interface (UI) 150 is associated with the controller 76.

Thereafter, belt 10 advances the electrostatic latent image recorded thereon to development station C. Development station C has three magnetic brush developer rolls indicated generally by the reference numerals 34, 36 and 38. A paddle wheel picks up developer material and delivers it to the developer rolls. When the developer material reaches rolls 34 and 36, it is magnetically split between the rolls with half of the developer material being delivered to each roll. Photoconductive belt 10 is partially wrapped about rolls 34 and 36 to form extended development zones. Developer roll 38 is a clean-up roll. The latent image attracts toner particles from the carrier granules of the developer material to form a toner powder image on the photoconductive surface of belt 10. Belt 10 then advances the toner powder image to transfer station D.

At transfer station D, a copy sheet is moved into contact with the toner powder image. First, photoconductive belt 10 is exposed to a pretransfer light from a lamp (not shown) to reduce the attraction between photoconductive belt 10 and the toner powder image. Next, a corona, generating device 40 charges the copy sheet to the proper magnitude and polarity so that the copy sheet is tacked to photoconductive belt 10 and the toner powder image attracted from the photoconductive belt to the copy sheet. After transfer, corona generator 42 charges the copy sheet to the opposite polarity to detack the copy sheet from belt 10. Conveyor 44 advances the copy sheet to fusing station E.

Fusing station E includes a fuser assembly indicated generally by the reference numeral 46 which permanently affixes the transferred toner powder image to the copy sheet. Preferably, fuser assembly 46 includes a heated fuser roller 48 and a pressure roller 50 with the powder image on the copy sheet contacting fuser roller 48. The pressure roller is cammed against the fuser roller to provide the necessary pressure to fix the toner powder image to the copy sheet. The fuser roll is internally heated by a quartz lamp. Release agent, stored in a reservoir, is pumped to a metering roll. A trim blade trims off the excess release agent. The release agent transfers to a donor roll and then to the fuser roll.

After fusing, the copy sheets are fed through a decurler 52. Decurler 52 bends the copy sheet in one direction to put a known curl in the copy sheet and then bends it in the opposite direction to remove that curl.

Forwarding rollers 54 then advance the sheet to duplex turn roll 56. Duplex solenoid gate 58 guides the sheet to the finishing station F, or to duplex tray 60. At finishing station F, copy sheets are stacked in a compiler tray and attached to one another to form sets. When duplex solenoid gate 58 diverts the sheet into duplex tray 60. Duplex tray 60 provides an intermediate or buffer storage for those sheets that have been printed on one side and on which an image will be subsequently printed on the second, opposite side thereof, i.e., the sheets being duplexed. The sheets are stacked in duplex tray 60 facedown on top of one another in the order in which they are copied.

In order to complete duplex copying, the simplex sheets in tray 60 are fed, in seriatim, by bottom feeder 62 from tray 60 back to transfer station D via conveyor 64 and rollers 66 for transfer of the toner powder image to the opposed sides of the copy sheets. Inasmuch as successive bottom sheets are fed from duplex tray 60, the proper or clean side of the copy sheet is positioned in contact with belt 10 at transfer station D so that the toner powder image is transferred thereto. The duplex sheet is then fed through the same path as the simplex sheet to be advanced to finishing station F.

The high capacity variable sheet size sheet feeder of the present invention, indicated generally by the reference numeral 100, is the primary source of copy sheets. Feed belt 81 feeds successive uppermost sheets from the stack to a take-away drive roll 82 and idler rolls 84. The drive roll and idler rolls guide the sheet onto transport 86. Transport 86 advances the sheet to rolls 66 which, in turn, move the sheet to transfer station D.

Secondary tray 68 and auxiliary tray 72 are secondary sources of copy sheets. Copy sheets are fed to transfer station D from the secondary tray 68 or auxiliary tray 72. Sheet feeders 70, 74 are friction retard feeders utilizing feed belts and take-away rolls to advance successive copy sheets to transport 64 which advances the sheets to rolls 66 and then to transfer station D. The copy sheet is registered just prior to entering transfer station D so that the sheet is aligned to receive the developed image thereon.

Invariably, after the copy sheet is separated from the photoconductive belt 10, some residual particles remain adhering thereto. After transfer, photoconductive belt 10 passes beneath corona generating device 94 which charges the residual toner particles to the proper polarity. Thereafter, the pre-charge erase lamp (not shown), located inside photoconductive belt 10, discharges the photoconductive belt in preparation for the next charging cycle. Residual particles are removed from the photoconductive surface at cleaning station G. Cleaning station G includes an electrically biased cleaner brush 88 and two de-toning rolls.

The various machine functions are regulated by a controller 76. The controller 76 is preferably a programmable microprocessor which controls all of the machine functions hereinbefore described. The controller provides a comparison count of the copy sheets, the number of documents being recirculated, the number of copy sheets selected by the operator, time delays, jam corrections, etc. The control of all of the exemplary systems heretofore described may be accomplished by conventional control switch inputs from the printing machine consoles selected by the operator. Conventional sheet path sensors or switches may be utilized to keep track of the position of the document and the copy sheets.

Figure 1:
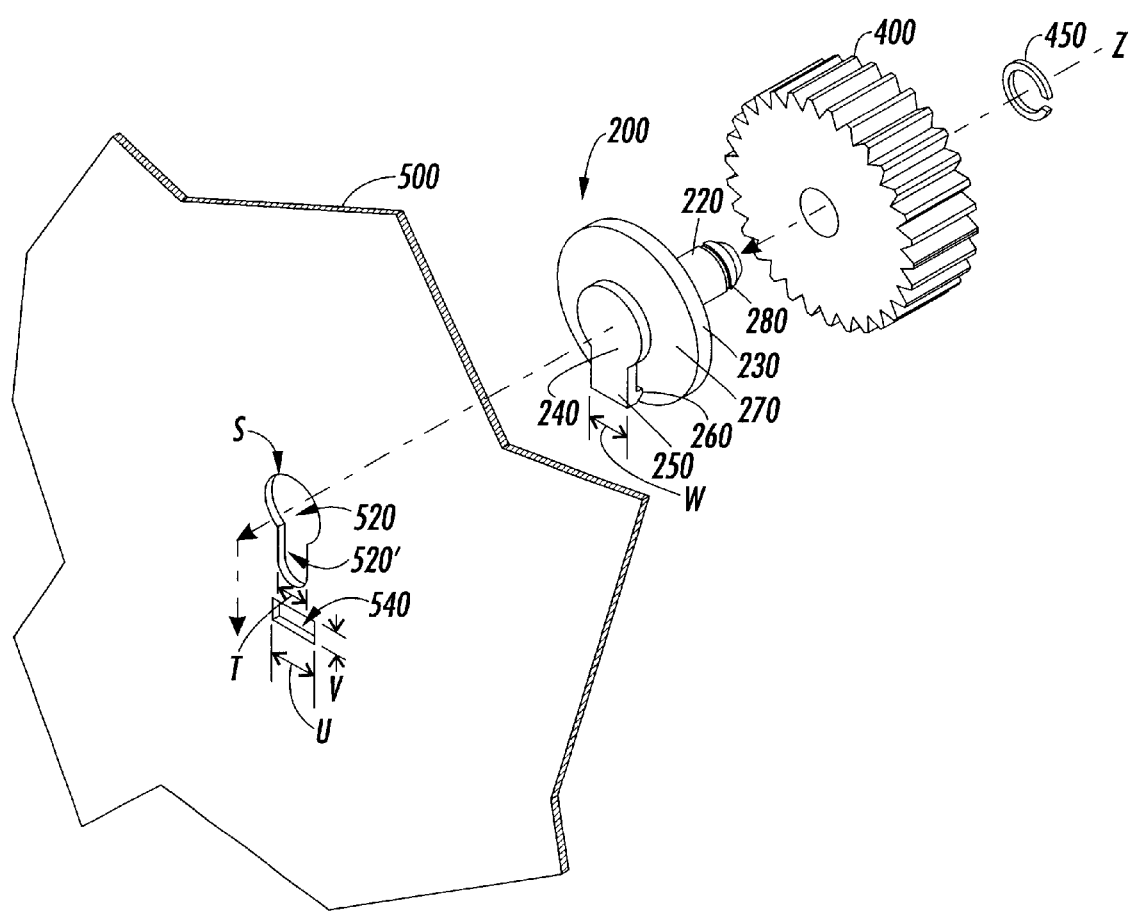
FIG. 1 illustrates a perspective view of a stud mounting system.
Figure 2:
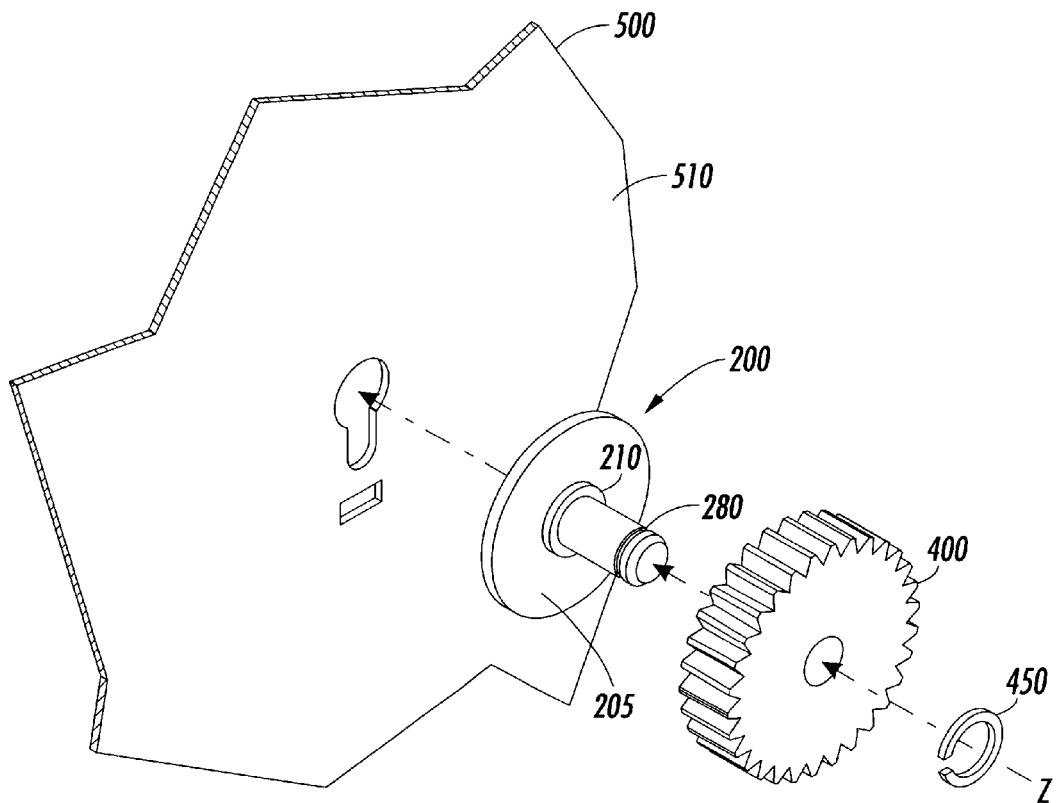
FIG. 2 illustrates another perspective of the stud mounting system of FIG. 1.

Turning now to FIGS. 1–2, illustrated is a partial cut-away view from the imaging machine of FIG. 10 illustrating the mounting stud 200 of the present invention as it is to be installed in a wall 500. The stud 200 may be associated with electrostatographic process members and document handling members in an imaging machine. The stud 200 includes a post 220, a flange 230, and a fastening member 240. The flange 230 extends radially from the post 220. The fastening member 240 includes flexible member 250 and end 260. The fastening member 240 originates from a surface 270 of the flange 230 and first extends axially along imaginary axis z and then extends a distance along the flexible member 250 to an end 260. The flange 230 has a surface 270 facing a surface of the flexible member 250. The surface 270 has an area greater than area of the surface of flexible member 250 facing the flange 230. The stud 200 is intended to be a generally low profile mounting system. Thus, the flexible member 250 extends substantially parallel to the flange 230, within about 0 to about 30 degrees, such as within about 10 degrees to the flange 230. The end 260 of the flexible member 250 may be adjacent the flange 230 in a free state and may be biased toward the flange 230. The flexible member 250 may be flexible such that the end 260 is movable from a free state position to an open position for allowing passage of a wall 500 or plate 515 into a slot 290. The end 260 of the flexible member 250 may fit in an opening 540 such as a notch or a hole for removable securement to a wall 500 or a plate 515.

The wall 500 or plate 515 (FIG. 9) has an opening 520 with a connected opening 520' to allow passage of the fastening member 240 through the wall 500. The openings 520, 520' together form an opening sufficient in size to allow the fastening member 240 to pass through from one side of the wall 500 to the other side of the wall 500. Once, the fastening member 240 is through the wall 500, the fastening member 240 is then moved toward the far end of the opening 520' toward the opening 540 causing the end 260 to become orienting in the opening 540 and removably secured to the wall 500. The openings 520, 520' together are larger than the opening 540. Also shown is a gear 400 as it is to be installed onto the post 220. The post 220 is formed in a generally cylindrical shape to allow rotation of the gear 400 thereon. The openings 520, 520' in the wall 500 may have a combined area that is larger than another opening 540. The combined area of openings 520, 520' allows the fastening member 260 to enter the openings 520, 520' as it extends from the flange 230 and also pass through the openings 520, 520' to the other side of the wall 500. A part of the fastening member 260, about the thickness X of the wall 500 or plate 515, remains in the openings 520, 520'. The openings 520, 520' prevent passage of the flange 230 through the wall 500. The wall 500 may be part of a housing of an imaging machine.

For installation, the fastening member 240 is axially inserted through openings 520, 520' of the wall 500 until the surface 270 of the flange 230 contacts a surface 510 of the wall 500. Then, the flexible member 250 and the end 260 are moved away from the flange 230 and the stud 200 is moved along the wall 500 as the wall 500 is inserted into the slot 290 between the flexible member 250 and the flange 230. The slot 290 allows a thickness X of the wall 500 to fit therein. The end 260 of the flexible member 250 is biased toward the flange 270 and once the end 260 reaches an opening 540 in the wall 500, the end 260 becomes situated in the opening 540 and the stud 200 is removably secured to the wall 500. The fastening member 240, including the flexible member 250 and the end 260, wraps around a portion of the wall 500 and cooperate with the openings 520, 520', 540 to removably secure the stud 200 to the wall 500. The fastening member 240 and the flange 230 provide sufficient surface area contact with the wall 500 to limit movement and rotation of the stud 200 with respect to the wall 500. The gear 400 may be removably secured to the post 220 using a fastening system such as a notch 280 and clip 450. A step member 210 at the intersection of the post 220 and the flange 230 may be used for seating the gear 400 against to minimize surface friction between moving surfaces. The step member 210 may extending radially outward from the post 220 and extend less than the flange 230. The stud may be removed from the wall 500 by first lifting the end 260 out of the opening 540 and then reversing the installation described above.

FIGS. 3 and 4 illustrate side elevational views of the stud 200. The flexible member 250 may extend substantially parallel to the flange 230 and may be moved away from the flange 230 to allow the wall 500 to pass into the slot 290 formed between the flexible member 250 and the flange 230. The stud 200 and openings 520, 520'; 540 cooperate to removeably secure and limit movement of the stud 200 with respect to the wall 500. The end 260 of the flexible member 250 may be formed in a shape sufficient for extending into the opening 540 and for removable securement to the opening 540. The end 260 may include a chamfer or angular portion for allowing generally easy positioning into the opening 540. The flange 230 may be circular, square, rectangular, or irregular. The flange 230 may be used for providing stability against the surface 510 of the wall 500 and for covering one side of the openings 520, 520', 540.

Figure 6:
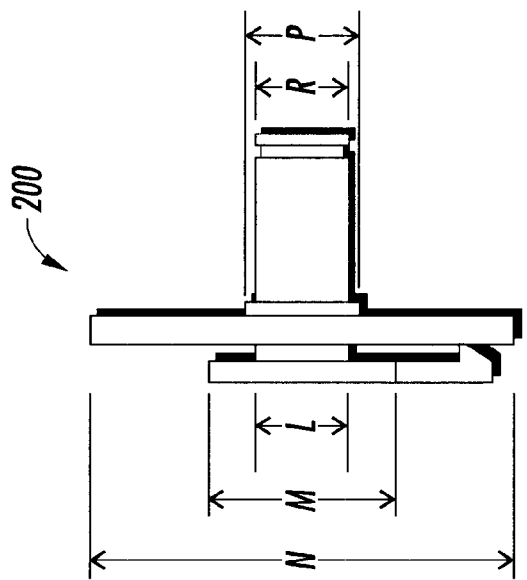
FIG. 6 is a side elevational view of a mounting stud.
Figure 5:
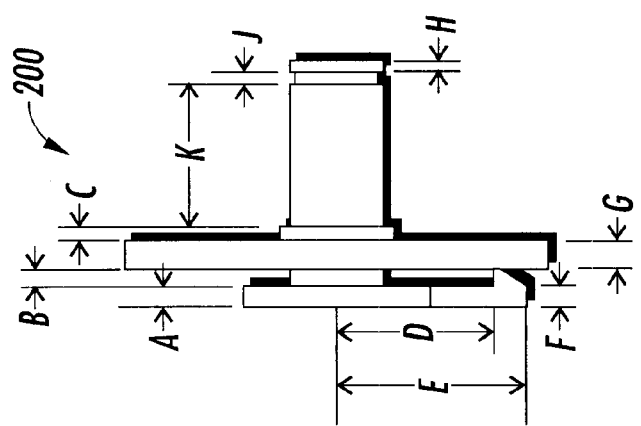
FIG. 5 is a side elevational view of a mounting stud.

FIGS. 5–6 illustrate side elevational views and dimensions of the stud 200. FIGS. 7–8 illustrates a front and back elevational views of the stud 200 disposed in a wall 500. The post 220 rotatably supports a gear 40.

Figure 9:
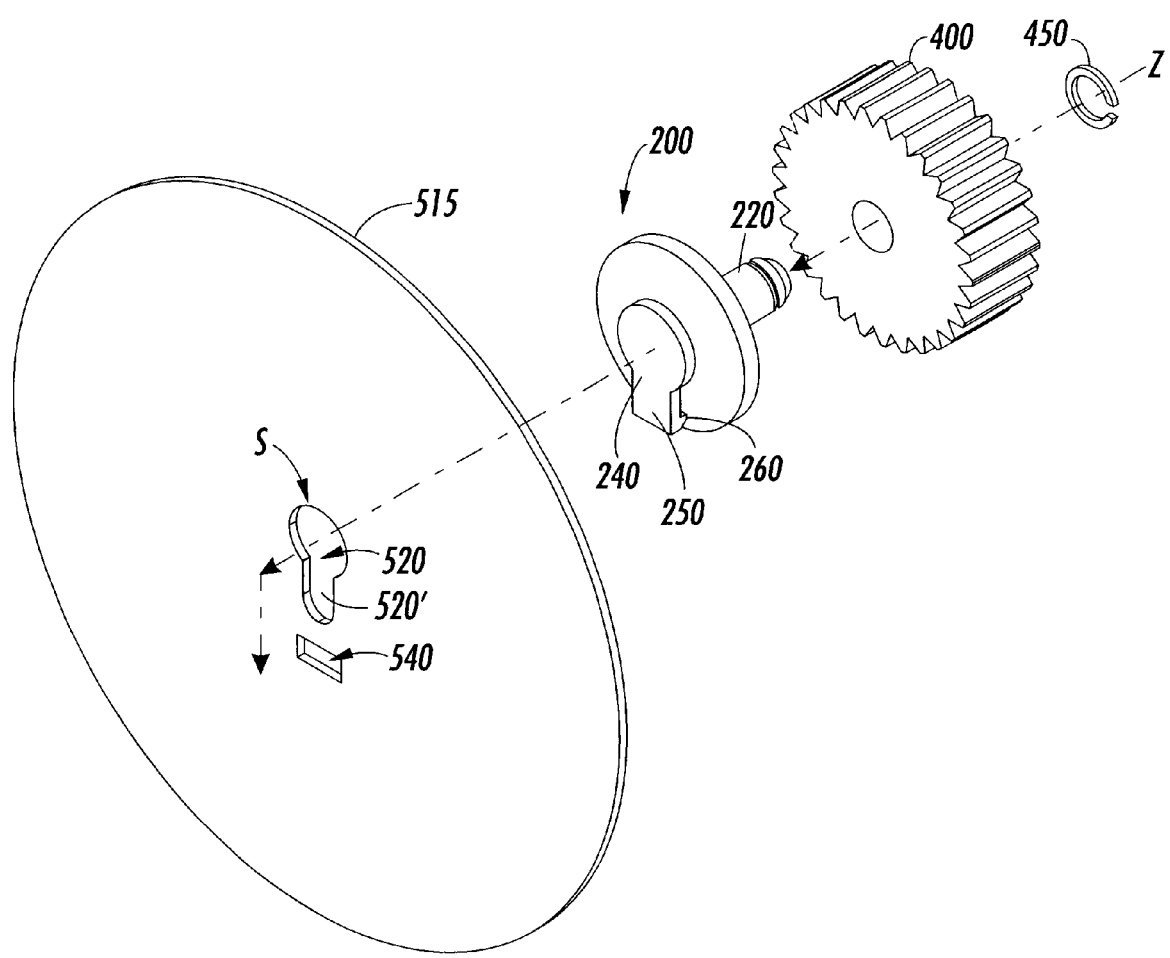
FIG. 9 illustrates a perspective view of the mounting stud along with a mounting plate.

Turning now to FIG. 9, there is illustrated a partial cut-away view from the imaging machine of FIG. 10 illustrating a perspective view of a mounting plate 515 and one of the studs 200 as it is to be mounted. The plate 515 may serve as a patch over an existing hole. The plate 515 may have a size and perimeter for covering a hole in a wall and include a plurality of openings 520, 520', 540. The openings 520, 520' in the wall 500 may have a combined area that is larger than opening 540. The opening 540 may include a notches or a hole. The combined area of openings 520, 520' may allow the fastening member 260 to enter the openings 520, 520' as it extends from the flange 230 and also pass through the openings 520, 520' to the other side of the wall 500. The combined area of the openings 520, 520' may prevent passage of the flange 230 through the plate 515. The plate 515 may be part of a housing of an imaging machine. The plate 515 may have a periphery which is round, square, rectangular or irregular provided it is large enough to mount over an opening in the wall 500 of an imaging machine. The plate 515 may be fastened to the wall 500 using thermal, chemical or mechanical systems including screws, rivets, welding, brazing, adhesives. The plate 515 may be permanent or removably securable to the wall 500 before or after the stud 200 is secured to the plate 515. Also shown is a gear 400 as it is installed on the post 220.

Other features and alternatives of the stud 220 are also envisioned for applications inside an imaging machine. The stud 200 may be formed using a generally simple manufacturing process using a material having a generally low coefficient of friction. The stud 200 may be comprised of a material having a coefficient of friction ranging from about 0.2 to about 0.3 and a hardness of about 1.3 ft-lb/in. The stud 200 may be molded in one-piece using a mold and may be comprised of plastic or nylon materials. The stud 200 may be comprised of a plastic resin including an Acetal resin. The stud 200 may be comprised of Delrin® 500CL which is commercially available from Dupont®. The stud 200 may further include a metal bearing (phosphor bronze) or a ball race on the post 220.

Various sizes and shapes of the various elements of the stud 200 are envisioned. For example, Dimension A may range from about 0.059 inches (1.5 mm) to about 0.157 inches (4 mm), preferably about 0.079 inches (2 mm); Dimension B may range from about 0.029 inches (0.75 mm) to about 0.118 inches (3 mm), preferably about 0.059 inches (1.5 mm); Dimension C may range from about 0.019 inches (0.5 mm) to about 0.079 inches (2 mm), preferably about 0.039 inches (1 mm); Dimension D may range from about 0.236 inches (6 mm) to about 0.945 inches (24 mm), preferably about 0.472 inches (12 mm); Dimension E may range from about 0.354 inches (9 mm) to about 1.417 inches (36 mm), preferably about 0.708 inches (18 mm); Dimension F may range from about 0.019 inches (0.5 mm) to about 0.079 inches (2 mm), preferably about 0.039 inches (1 mm); Dimension G may range from about 0.059 inches (1.5 mm) to about 0.236 inches (6 mm), preferably about 0.118 inches (3 mm); Dimension H may range from about 0.029 inches (0.75 mm) to about 0.079 inches (2 mm), preferably about 0.059 inches (1.5 mm); Dimension J may range from about 0.015 inches (0.4 mm) to about 0.063 inches (1.6 mm), preferably about 0.031 inches (0.8 mm); Dimension K may range from about 0.255 inches (6.5 mm) to about 1.024 inches (26 mm), preferably about 0.512 inches (13 mm); Diameter L may range from about 0.157 inches (4 mm) to about 0.630 inches (16 mm), preferably about 0.315 inches (8 mm); Diameter M may range from about 0.314 inches (8 mm) to about 1.260 inches (32 mm), preferably about 0.630 inches (16 mm); Diameter N may range from about 0.708 inches (18 mm) to about 2.835 inches (72 mm), preferably about 1.417 inches (36 mm); Diameter P may range from about 0.256 inches (6.5 mm) to about 0.866 inches (22 mm), preferably about 0.433 inches (11 mm); Diameter R may range from about 0.157 inches (4 mm) to about 0.630 inches (16 mm), preferably about 0.315 inches (8 mm); Diameter S may range from about 0.354 inches (9 mm) to about 1.417 inches (36 mm), preferably about 0.708 inches (18 mm); Diameter T may range from about 0.159 inches (4.05 mm) to about 0.632 inches (16.05 mm), preferably about 0.317 inches (8.05 mm); Dimension U may range from about 0.177 inches (4.5 mm) to about 0.708 inches (18 mm), preferably about 0.354 inches (9 mm); Dimension V may range from about 0.118 inches (3 mm) to about 0.472 inches (12 mm), preferably about 0.236 inches (6 mm); Dimension W may range from about 0.157 inches (4 mm) to about 0.630 inches (16 mm), preferably about 0.315 inches (8 mm); Wall thickness X may range from about 0.024 inches (0.6 mm) to about 0.094 inches (2.4 mm), preferably about 0.047 inches (1.2 mm); and End 260 may move a distance ranging from about 0.027 inches (0.7 mm) to about 0.098 inches (2.5 mm), preferably about 0.051 inches (1.3 mm) to accommodate the wall 500 in the slot 290. The dimension U may be much wider than the dimension W provided the end 260 is firmly removably securable to the opening 540'. The openings 520, 520', 540 each have a function and their size with respect to the features of the stud 200 provides a firm fit between the stud 200 and the wall 500 or plate 515. Further openings and slots in the wall 500 or plate 515 and further attachment features on the stud 200 are envisioned although their addition may alter the strength of the stud 200 and the wall 500 or plate 515.

In recapitulation, there is provided a stud 200 for supporting a component such as a gear 400 to a wall 500 or plate 515 of an imaging machine such as a xerographic apparatus. The stud 200 described herein may generally be easily mounted and easily removed from an imaging machine without complex assembly or disassembly of components.

While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A stud apparatus comprising:
   a first member extending along an imaginary axis between a proximal end and a distal end, the first member including an outside periphery;
   a second member extending from the distal end of the first member axially along the imaginary axis and extending radially outward from the imaginary axis past the outside periphery of the first member;
   a third member extending from the second member axially along the imaginary axis and extending radially outward from the imaginary axis, the third member including a leg extending outward from the imaginary axis spaced from the second member, the leg including an end extending in a direction toward the second member; wherein the stud apparatus is non-threaded.

2. The stud apparatus according to claim 1 further comprising a wall functionally associated with the stud apparatus, the wall including a plurality of openings, each opening having an area; wherein the area of one opening allows the third member to at least one of enter the opening and pass through the opening and wherein the area of the one opening prevents passage of the second member through the wall.

3. The stud apparatus according to claim 2 wherein the wall is situated between the second member and the third member and the stud apparatus is removeably securable to the wall.

4. The stud apparatus according to claim 3 wherein the wall is part of a housing of an imaging machine.

5. The stud apparatus according to claim 4 further comprising a component removably secured to the first member.

6. The stud apparatus according to claim 5 wherein the second member has a first surface area facing the leg and the leg has a second surface area facing the second member, the first surface area being greater than the second surface area.

7. The stud apparatus according to claim 6 wherein the leg extends substantially parallel to the second member.

8. The stud apparatus according to claim 2 wherein the plurality of openings includes at least one of a notch and a hole and wherein the end of the leg is adapted to fit in the at least one of the notch and the hole for removable securement to the wall.

9. The stud apparatus according to claim 2 wherein the second member and the third member cooperate with the other to substantially limit movement of the first member with respect to the wall.

10. The stud apparatus according to claim 2 wherein one opening is larger than the other opening.

11. The stud apparatus according to claim 1 wherein the end of the leg is functionally adjacent the second member in a free state.

12. The stud apparatus according to claim 1 further comprising a plate member functionally associated with the stud apparatus, the plate member having a size and perimeter for covering a hole in a wall, the plate member including a plurality of openings; wherein the area of one opening allows the third member to at least one of enter the opening and pass through the opening and wherein the area of the one opening prevents passage of the second member through the wall, the plate member adapted to be securable to a housing.

13. The stud apparatus according to claim 1 wherein the leg is flexible and the end is movable from a first position to a second position.

14. The stud apparatus according to claim 1 further comprising a fourth member between the first member and the second member, the fourth member forming a step extending radially outward from the first member and extending radially outward less than the second member.

15. The stud apparatus according to claim 1 wherein the end of the leg is biased toward the second member.

16. The stud apparatus according to claim 1 wherein the stud apparatus comprises a plastic resin.

17. The stud apparatus according to claim 16 wherein the plastic resin includes an Acetal resin.

18. A stud apparatus comprising:
    a member including a first portion and a second portion, the first portion extending a distance and including a flange, a post, and a proximal end, the post for receiving a component thereon; the second portion extending from the first portion for a distance to a distal end, the distal end including a protrusion;
    wherein the distal end is adapted to move between a first position and a second position for forming an opening between the protrusion and the flange and for receiving a wall functionally adjacent the proximal end and wherein the protrusion is for fitting in an opening in the wall when the distal end is in the first position; and wherein the second portion includes a leg extending a distance substantially parallel to the flange when the distal end is in the first position.

19. A stud apparatus comprising:
    a post having a length, the post for receiving a component thereon; and
    a clip extending from one end of the post, the clip including a flange and a leg, the leg extending for a distance to a distal end, the distal end of the leg including a protrusion;
    wherein the leg is adapted to move between a first position and a second position for forming an opening between the protrusion and the flange and for receiving a wall functionally adjacent the flange;
    wherein the protrusion is for fitting in an opening in the wall when the distal end is in the first position; and
    wherein the clip member is non-threaded.

* * * * *